3,000,973
CHLORINATED DERIVATIVES OF DIELS-ALDER ADDUCT OF TETRACHLOROCYCLOPENTADIENE AND CYCLOPENTADIENE
Arthur Goldman and Morton Kleiman, Chicago, Ill., assignors to Velsicol Chemical Corporation, Chicago, Ill., a corporation of Illinois
No Drawing. Filed Nov. 24, 1958, Ser. No. 775,700
4 Claims. (Cl. 260—648)

This invention relates to the production of new insecticidal compositions of matter and is a continuation-in-part of our copending application Serial No. 535,535, filed September 20, 1955, now abandoned, which in turn is a continuation of our application Serial No. 282,262, filed April 14, 1952, now abandoned, which was copending therewith.

More specifically, this invention relates to the Diels-Alder adduct of tetrachlorocyclopentadiene and cyclopentadiene and to the chlorinated derivatives of this adduct.

Since about 1943, when the chlorinated insecticide DDT was imported into the United States, great interest and research have been devoted to the development of other potent, residual, chlorinated insecticides. This research has resulted in the production of various residual, chlorinated insecticides which give excellent protection against insect infestation for protracted periods. With the development of insecticides having greater toxicity to insects and increased residual characteristics, the problem of food contamination when residual insecticides are applied to growing crops arises. It is, therefore, extremely desirable to develop insecticides which will exhibit residual characteristics, but which at the same time will volatilize so that none will remain at the time of harvest.

One object of the present invention is the production of new and useful insecticides.

Another object is the manufacture of an insecticide which has a controlled residual toxicity.

Another object is the manufacture of an insecticidal material which has sufficient volatility to exert a fumigant action while retaining residual toxicity.

Another object of this invention is the production of insecticidal material with a vapor pressure which is sufficiently high to insure evaporation of residues from food crops.

These and other objects of this invention will be apparent from a consideration of the following specification and appended claims.

The products of the present invention are the Diels-Alder adduct of tetrachlorocyclopentadiene and cyclopentadiene having 0 to 3 more chlorine atoms attached to the carbon atoms of said adduct in positions 1 to 3, with no one carbon atom in positions 1 to 3 having more than one chlorine atom. It is pointed out that these additional chlorine atoms are attached to carbon atoms of the adduct in the positions 1, 2 and 3 and that the number 8 carbon atom (the endomethylene group) remains undisturbed by the reaction.

The Diels-Alder reaction of tetrachlorocyclopentadiene and cyclopentadiene is exemplified by the following equation:

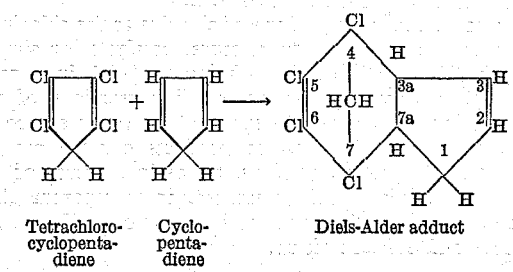

Tetrachlorocyclopentadiene    Cyclopentadiene    Diels-Alder adduct

For convenience, the 1:1 addition product of tetrachlorocyclopentadiene and cyclopentadiene will hereafter be referred to as DAA.

Tetrachlorocyclopentadiene, which is the starting material in the preparation of the products of the present invention, is prepared by chlorinating cyclopentadiene with aqueous, alkaline, alkali metal hypochlorite solution. Alkali metal hypochlorites such as sodium, lithium or potassium hypochlorite are satisfactory. For convenience, a specific example of the preparation of tetrachlorocyclopentadiene is presented herewith as Example I.

EXAMPLE I

Into a 3-liter, 3-necked flask equipped with an efficient stirrer, reflux condenser and thermometer were placed 2300 ml. aqueous, alkaline sodium hypochlorite solution (1.262 M, OCl⁻; 0.248 M, OH⁻; the alkaline reagent utilized was sodium hydroxide), and 33 g. freshly prepared cyclopentadiene. The contents of the flask were mixed and simultaneously cooled so as to maintain an internal temperature of about 25° C. Samples were periodically removed and analyzed for hypochlorite concentration by titrating a known volume of the aqueous phase iodimetrically. The stirring was continued until the analysis remained constant, showing no further reaction taking place. The reaction is substantially complete after about twenty minutes. At the end of this time stirring was discontinued and the layers of organic and inorganic material were separated. The organic fraction was dried with anhydrous $MgSO_4$ and filtered. Tetrachlorocyclopentadiene was isolated in a pure state from the organic product by vacuum fractional distillation at 0.7 mm. of mercury pressure. Tetrachlorocyclopentadiene was collected as distillate at overhead temperature between 30.7° C. and 32.3° C. This product had the following analysis:

| | C, percent | H, percent | Cl, percent |
|---|---|---|---|
| Analysis of Product | 29.40 | 1.04 | 69.37 |
| Calculated for $C_5H_2Cl_4$ | 29.45 | 0.99 | 69.56 |

The 1:1 adduct of tetrachlorocyclopentadiene and cyclopentadiene (DAA) is formed by reacting these two components preferably in equal molar ratios and either in the presence or the absence of a mutual solvent. A process specifically illustrating formation of DAA is shown in Example II.

EXAMPLE II

Tetrachlorocyclopentadiene (102 g.; 0.5 mole) was placed in a 3-necked flask equipped with a stirrer, thermometer and reflux condenser. While maintaining the temperature of the tetrachlorocyclopentadiene at a temperature of 65–70° C., cyclopentadiene (40 grams) was added slowly over a period of about one hour. The reaction mixture was continuously stirred during this addition of cyclopentadiene. After addition was complete the reaction mixture was heated with stirring at 70° C. for an additional four hours. The product was purified by fractional distillation at 0.2 mm. of mercury pressure (absolute) and the desired fraction was collected at 188° C. This material is a light oil having a refractive index of 1.5568 at 20° C. This oil solidifies on standing and after recrystallization from cold methanol, has a melting point of 55-57° C.

|  | C, percent | H, percent | Cl, percent |
|---|---|---|---|
| Analysis of purified product | 44.77 | 2.83 | 52.02 |
| Calculated for $C_{10}H_8Cl_4$ | 44.48 | 2.99 | 52.53 |

The DAA, as prepared in accordance with the method given in Example I, has insecticidal activity. This activity may be greatly increased by further chlorination as hereinafter discussed.

The beneficial effects obtained by the chlorination of DAA can be accomplished by addition chlorination or substitution chlorination, or a combination of both so that DAA contains from 1 to 3 more chlorine atoms positioned at carbon atoms 1 to 3 of DAA with none of said carbon atoms having more than one chlorine atom attached thereto, and with none of the added chlorine atoms being positioned at the number 8 carbon atom.

Specifically, the beneficial effects observed by chlorinating DAA may be accomplished by adding two chlorine atoms across the double bond in the unsubstituted cyclopentene ring of DAA (carbon atoms numbered 2 and 3) or by substituting a chlorine atom in the number 1 position of DAA, or by a combination of both.

The following examples specifically illustrate the preparation of these products.

EXAMPLE III

To a stirred solution of DAA (25 g.) in $SO_2Cl_2$ (75 ml.) and $S_2Cl_2$ (0.2 ml.) maintained at a temperature of 40-50° C. was added in a dropwise manner a solution of $AlCl_3$ (0.33 g.) in $SO_2Cl_2$ (5 ml.). A vigorous reaction took place and when it had subsided the reaction mixture was heated at reflux for 10 minutes. Unreacted $SO_2Cl_2$ and other volatiles were removed by vacuum distillation. The residue from the distillation was extracted with isopropyl ether and the resulting solution was washed with water and dilute aqueous sodium bicarbonate solution. The solvent was removed by evaporation and the residue was further purified by trituration with cold methanol. The purified product melted at 105-108° C.

|  | C | H | Cl |
|---|---|---|---|
| Analysis of purified product: | 35.19% | 2.35% | 62.48% |
| Calculated for $C_{10}H_8Cl_6$: | 35.22% | 2.37% | 62.40% |

The reaction of Example III may be illustrated by the following equation:

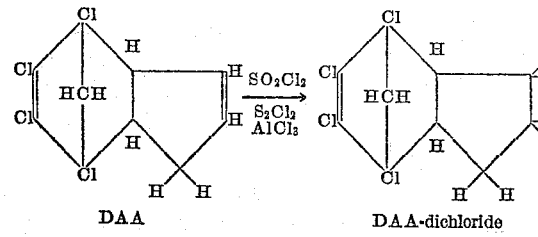

EXAMPLE IV

A. Preparation of 1-hydroxy-DAA

A mixture of DAA (8.1 g.), $SeO_2$ (1.8 g.) pure dioxane (16 ml.), and water (0.3 ml.) was heated under reflux for 27 hours. Precipitated selenium was collected by filtration. The filtrate was concentrated in vacuo, and the residue was extracted with isopropyl ether. The extract solution was washed several times with water and sodium bicarbonate solution and then dried over anhydrous $MgSO_4$. Evaporation of the ether left an oil residue. Crystallization of this oil from pentane gave a product which melted at 90-93° C.

The analysis for this material was the following:

|  | C, percent | H, percent | Cl, percent |
|---|---|---|---|
| Analysis of purified product | 42.27 | 2.83 | 49.62 |
| Calculated for $C_{10}H_8OCl_4$ | 41.99 | 2.82 | 49.59 |

B. Conversion of 1-hydroxy-DAA to 1-chloro-DAA

To 1-hydroxy DAA (33.4 g.) in a reaction vessel equipped with a stirrer and reflux condenser, was added $SOCl_2$ (35 ml.). A vigorous evolution of gas accompanied by heat of reaction was observed. When visual evidence of reaction had subsided the reaction mixture was refluxed for three hours. Excess $SOCl_2$ was evaporated under vacuum. The residue was dissolved in ether, washed with water and sodium bicarbonate solution, and then dried over anhydrous $MgSO_4$. The ether solvent was removed by evaporation and the residue was dissolved in pentane and further purified by adsorption upon an alumina column followed by elution with pentane. The pentane was then removed by evaporation and the oily residue further purified by fractional distillation at a pressure of 0.25-0.3 mm. of mercury pressure (absolute). The desired pure material when recrystallized from methanol had a melting point of 67-69° C.

The elementary analysis was:

|  | C, percent | H, percent | Cl, percent |
|---|---|---|---|
| Analysis of purified product | 39.40 | 2.27 | 58.09 |
| Calculated for $C_{10}H_7Cl_5$ | 39.45 | 2.32 | 58.23 |

The product thus prepared in Example IV has the structure.

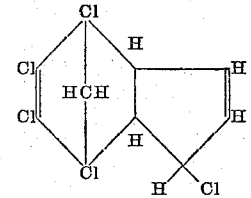

It is evident from Examples III and IV that chlorination of DAA by addition or substitution in positions 1 to 3 are not necessarily mutually exclusive. For example, one may readily chlorinate all three available positions in the unsubstituted cyclopentene ring of DAA by first chlorinating DAA in accordance with Example IV and then further chlorinating the resulting 1-chloro-DAA in accordance with Example III (allowing only for the known stoichiometric difference between DAA and 1-chloro DAA) to produce DAA having three more chlorine atoms, as shown in the following structure:

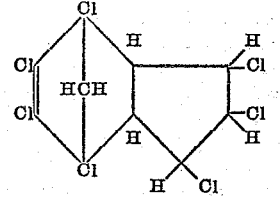

Chlorination of DAA to introduce from 1 to 3 more chlorine atoms on the number 1, 2, and 3 carbon atoms can also be effected by the use of chlorine as the chlorinating agent. One may use pressure, catalysts, or simply bubble chlorine through a solution of DAA in a relatively inert solvent. The chlorination reactions of the present invention are not dependent on the presence or absence of light. Thus, the products claimed can be prepared in opaque apparatus, or, as in the case of the specific examples herein presented, in transparent glass apparatus subjected to normal illumination sufficient for normal and efficient vision.

An example of the usefulness of these compositions of matter may be seen in the following table:

| | Dosage, μg. | Percent Mortality in 48 hrs. (German roaches) | |
|---|---|---|---|
| 1-chloro DAA | 1 | 85% male | 30% female. |
| dichloro DAA | 1 | 100% male | 95% female. |
| DDT | 1.72 | 40% male | 0% female. |

The products of the present invention may be formulated and applied in a like manner as are other chlorinated insecticides. Exemplary of such formulations and applications are dusts, wettable powders, dispersions, oil sprays, aerosols, and fogs.

The present products are soluble in most organic solvents, such as petroleum solvents, naphthas, kerosene, benzene, chlorinated hydrocarbons, ethers, ketones, esters, alcohols, etc., and are therefore eminently suited for general application in various formulations.

We claim:

1. As a new composition of matter a compound of the formula:

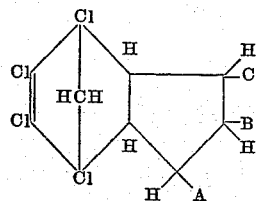

wherein at least one of the substituents A, B, and C is chlorine and the remainder are selected from the group consisting of hydrogen and chlorine and wherein B and C constitute a carbon-to-carbon bond when A alone is chlorine.

2. As a new composition of matter a compound of the formula:

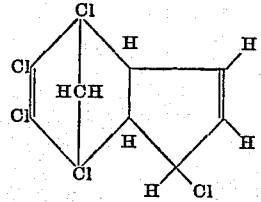

3. As a new composition of matter a compound of the formula:

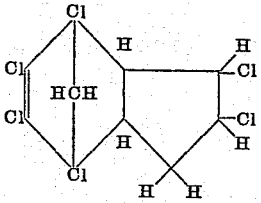

4. As a new composition of matter a compound of the formula:

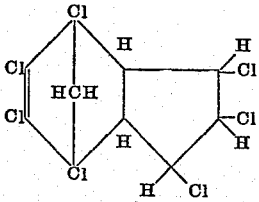

References Cited in the file of this patent
UNITED STATES PATENTS
2,519,190   Hyman _____ Aug. 15, 1950